US008926839B2

(12) United States Patent
Augier et al.

(10) Patent No.: US 8,926,839 B2
(45) Date of Patent: Jan. 6, 2015

(54) SIMULATED MOVING BED COLUMN WITH A LIMITED DEGREE OF IMMERSION OF THE DISTRIBUTION SYSTEM AND OPTIONAL STIFFENING ELEMENTS WITHIN THE GRANULAR BED

(75) Inventors: Frederic Augier, Saint Symphorien D'Ozon (FR); Gerard Hotier, Rueil Malmaison (FR)

(73) Assignee: IFP Energies Nouvelles, Rueil Malmaison Cedex (FR)

(*) Notice: Subject to any disclaimer, the term of this patent is extended or adjusted under 35 U.S.C. 154(b) by 516 days.

(21) Appl. No.: 13/154,874

(22) Filed: Jun. 7, 2011

(65) Prior Publication Data
US 2011/0303602 A1    Dec. 15, 2011

(30) Foreign Application Priority Data
Jun. 9, 2010    (FR) ...................... 10 02426

(51) Int. Cl.
*B01D 15/18*    (2006.01)
*B01D 15/14*    (2006.01)
*B01J 8/00*    (2006.01)
*B01J 8/04*    (2006.01)

(52) U.S. Cl.
CPC ............ *B01D 15/1842* (2013.01); *B01D 15/14* (2013.01); *B01J 8/008* (2013.01); *B01J 8/0453* (2013.01); *B01J 8/0492* (2013.01); *B01J 2208/00849* (2013.01); *B01J 2208/00893* (2013.01); *B01J 2208/0092* (2013.01)
USPC ........... 210/264; 210/269; 210/283; 210/284; 210/289

(58) Field of Classification Search
USPC ............... 210/198.2, 264, 269, 283, 284, 289
See application file for complete search history.

(56) References Cited

U.S. PATENT DOCUMENTS

| 3,214,247 A | 10/1965 | Broughton |
| 5,200,075 A * | 4/1993 | Otani et al. ................... 210/283 |
| 2008/0217232 A1 * | 9/2008 | Hotier et al. ............... 210/198.2 |

FOREIGN PATENT DOCUMENTS

| BE | 644021 A | 6/1964 |
| FR | 2930454 A1 | 10/2009 |
| WO | 2009133254 A1 | 11/2009 |

OTHER PUBLICATIONS

Augier et al, Applications of computational fluid dynamics to fixed bed adsorption calculations: Effect of hydrodynamics at laboratory and industrial scale, Oct. 2008, Separation and Purification Technology, vol. 63 (2008), pp. 466-474.*
Institut National De La Propriete Industrielle: "Search Report and Written Opinion". FR1002426. Applicant: IFP. Mailed: Jan. 10, 2011.

* cited by examiner

*Primary Examiner* — Matthew O Savage
(74) *Attorney, Agent, or Firm* — Millen, White, Zelano & Branigan, P.C.

(57) ABSTRACT

The present invention describes a device for the distribution of fluids in a multi-stage column operating in simulated moving bed (SMB) mode comprising, in the direction of flow of the principal fluid, a distribution system (6) for auxiliary fluids, and a distributor plate (10) supported by stiffening elements (7) located below said plate (10), said device being interposed between two successive beds of granular solid (2) denoted the upstream and downstream bed, the distribution system and the stiffening elements being immersed in the upstream and downstream granular beds to a slight extent with an upper limit for the degree of immersion.

1 Claim, 2 Drawing Sheets

SIMULATED MOVING BED COLUMN WITH A LIMITED DEGREE OF IMMERSION OF THE DISTRIBUTION SYSTEM AND OPTIONAL STIFFENING ELEMENTS WITHIN THE GRANULAR BED

FIELD OF THE INVENTION

The invention relates to a novel device for distribution and collection of fluids in a multi-stage column employing a flow of said fluids in a solid particle medium termed a granular medium. The term "multi-stage column" is used for a column constituted by a plurality of beds of granular solid disposed along a substantially vertical axis. Each granular bed is supported by a support plate.

The various successive beds are traversed in series by the fluid or fluids employed in the column. The fluid traversing the successive beds is termed the principal fluid to distinguish it from other auxiliary fluids which may be added to the principal fluid via plates generally located between two successive beds and known as distributor plates.

Each bed is supplied by a distributor plate located upstream of said bed.

The present invention pertains to the distribution of the volumes occupied by the distributor plates, the granular beds, and certain internal means linked to the distributor plate which will be described in more detail below.

In the remainder of the text, when the abbreviated term "plates" is used, this means distributor plates.

A distributor plate typically comprises a fluid supply or collection system termed the distribution system, and one or more mixing chambers for mixing fluid injected or withdrawn via the distribution system with the principal fluid.

In order to stiffen the distributor plates, girders may be used. The plates may then be placed on the girders. Other systems are possible in order to stiffen the plates; they are generally termed stiffening elements.

In the context of the present invention, the term "internal means" refers to the fluid distribution system and the girders or any other element for stiffening the distributor plates.

The invention essentially consists of leaving the granular beds free of any obstacles.

In this goal, the internal means, the distribution system and stiffening elements, or at least one of the two, are integrated into the distributor plate itself.

More precisely, a distributor plate in accordance with the invention is preferably a plate in which the distribution system for the fluids and the stiffening elements are positioned inside said plate itself.

In general, said integration of the internal means inside the distributor plate itself is accompanied by an increase in the volume of said plate. The present invention thus results in a modified distribution of volume, compared with the prior art, between the volume occupied by the granular bed, the volume of the plate and the volume of the internal means.

The present invention aims to at least partially avoid the presence of elements embedded in the granular medium, which has the effect of improving the flow of fluid in the granular medium and thus the performance of the device as a whole, despite a possible reduction in the percentage of the volume corresponding to the granular bed.

EXAMINATION OF THE PRIOR ART

In multi-stage processes of the separation reactor or column type, the distribution devices employed may have several functions, such as injection or withdrawal of a flow of fluid in the reactor or column at any level of said column. It is generally desirable for said injection or withdrawal function to be carried out in a balanced manner between the various regions of the column section.

The section of the column is in fact generally divided into a certain number of sectors, each sector having to be irrigated in a homogeneous manner with respect to the others.

This implies the use of distributors with a particular geometry, which can reach each sector and deliver (or withdraw) an approximately equal flow over each of the sectors, if they have equal surface areas. If the sectors have different surface areas, the injected or withdrawn flows are approximately proportional to the surface area of the associated sectors.

When the columns concerned have large dimensions (for example between 3 and 15 meters in diameter), systems using lines with a certain amount of branching are often used to channel the fluids from the outside of the column to the various plates of the multi-stage column, then from a given plate towards each of the sectors of said plate.

The plates also fulfill a function of mixing between the principal flow in the column and the flows injected by the system, in order to supply the granular bed located downstream of said plate with fluid at a homogeneous concentration.

Examples of patents concerning processes for separation by adsorption on multi-stage columns of the chromatographic or SMB type are WO 2006/027118 A1, US 2006/0108274 A1, EP 0 074 815, FR 93/09593, which provide examples of configurations for the distribution systems supplying plates positioned at different heights in the column.

The distribution systems may be fairly bulky, and it is routine for such systems to be positioned in the bed of granular solid (catalyst or adsorbent) in order to minimize the total volume of the column.

Until now, the skilled person has maximized the volume of the granular medium in the reaction chamber; this is generally accomplished by minimizing the height of the distributor plates, and by positioning the distribution and/or the collection systems within the granular medium itself.

Further, in patent WO 09/133254, positioning the systems within the distributor plates themselves is presented as not being pertinent, since it results in distributor plates which are too voluminous. This is also the case for the stiffening devices for the distributor plates which are often at least partially immersed within the granular bed. It is, for example, routine to use girders embedded partially or completely in the granular medium. A description of such stiffening devices can be found in French patent application FR 09/02803.

BRIEF DESCRIPTION OF THE INVENTION

Figure 2:
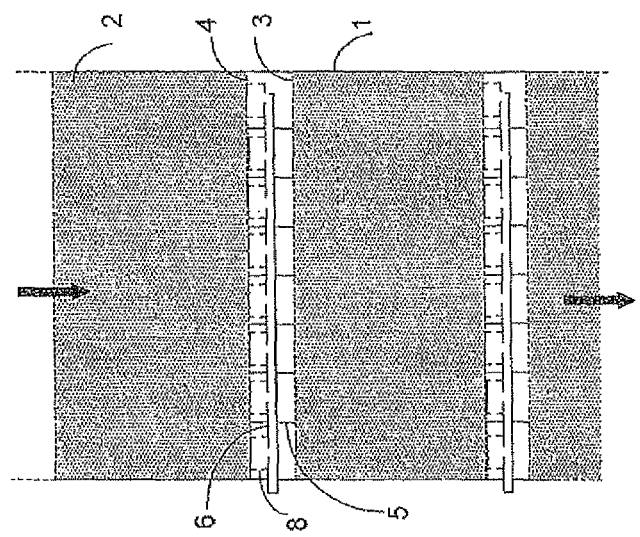
FIG. 2 shows a device of the present invention. The distribution system is now positioned in the plate itself.

The invention consists in using a distributor plate in which the distribution and stiffening internal means are partially or completely included in the distributor plate itself. An article in the review by Augier F, Laroche C, Brehon E, "Separation and purification technology", 63, 2, 466-474, Oct. 22, 2008) has recently demonstrated that obstacles present in the granular medium generate axial dispersion, which deteriorates the flow in the granular medium and may deleteriously affect the performance of the process, especially in the case of adsorption. A method was also proposed in that article for estimating the impact of internal distribution means embedded in the granular medium. That method has been used to demonstrate the advantages of the present invention.

Positioning the distribution systems and the stiffening devices in the distributor plates is possible if it is accepted that the height of the plates will be increased and thus a fraction of the useful volume in the column will be lost. In a given column with a fixed volume, this means that the volume occupied by the plates is increased and thus the volume of the granular medium is partially reduced.

However, unexpectedly, it has been discovered that the loss of granular medium volume was more than compensated for by the improvement in the flow in the granular medium due to the absence of or the reduction in volume of obstacles embedded therein.

Positioning the internal distribution and stiffening means in the distributor plates may thus in some cases improve the performance of the process as a whole.

More precisely, the present invention can be defined as a device for the distribution of fluids comprising, in the direction of flow of the principal fluid, a distribution system for auxiliary fluids, a distributor plate supported by stiffening elements located beneath said plate, said device being interposed between two successive beds of granular solid, the percentage by volume of the distribution system and the stiffening elements which is immersed within the granular medium being in the range 0 to 3%, preferably in the range 0 to 2%. This percentage by volume is expressed with respect to the upstream and downstream beds.

The case corresponding to 0% means that the distribution system and the stiffening elements are entirely integrated into the plate itself. The useful volume of the column is thus divided into the volume of the granular bed and the volume of the distributor plate.

The case corresponding to a percentage of x %, where x % is less than 3%, precisely means that the distribution system and the stiffening elements have overall a proportion of their volume which corresponds to x % of the volume of the granular bed. They are immersed in the granular bed to a proportion of x %, where x % is less than 3%.

The limit of 3% to the immersed volume corresponds to the sum of the immersed volumes of the distribution system and the stiffening elements.

If the device does not have stiffening elements, the limitation of 3% then applies to the distribution system alone.

In a preferred variation of the invention, the device for distribution of fluids in a multi-stage column operating in simulated moving bed (SMB) mode is such that the height of the distributor plate is less than 0.3 m, preferably less than 0.2 m.

The advantage of the invention is particularly marked for large multi-stage devices. In effect, when the diameter of the adsorber is sufficiently large, i.e. more than 3 meters, and preferably more than 7 meters, it is necessary to divide the distributor plates into sectors or panels. Such a division of plates into sectors is detailed in patents WO 2006/055222 A1, US 2009/0321359 A1, WO 2008/125751 A1 and US 2008/0217232 A1. The panels may be radial sectors or parallel sectors aligned along a diameter of the column.

When the distributor plates are divided into panels, each panel is supplied by the distribution system, which necessitates the use of a complex system comprising a multitude of lines. Dividing the plates into various panels is necessary in order to ensure good distribution quality, especially when the diameter of the adsorbers exceeds a critical dimension of more than 3 meters, and preferably more than 7 meters. Thus, for a diameter exceeding 3 meters, and even more so when it exceeds 7 meters, sectoring the distributor plates into panels is practically unavoidable, and concomitantly the volume occupied by the distribution system becomes very large.

Furthermore, the fact of using plates divided into panels and supplied via a complex distribution system with a large number of lines increases the overall weight of the distribution device (distribution system and plate). Hence, stiffening elements of the girder type are used to limit flexing of the plates and degradation of the flow in the plates and in the granular bed which may result. The stiffening elements are thus important in limiting flexing of the plates, more particularly so in large diameter adsorbers.

For these reasons, the invention is of great benefit in large diameter adsorbers, and the larger the diameter becomes, the more advantageous is the invention.

DESCRIPTION OF THE FIGURES

The detailed description of the invention will be made with reference to FIGS. 1 to 4.

FIG. 1:

The vessel 1 represents a multi-stage column with distributor plates in accordance with the prior art. The column is divided into a certain number of granular beds 2. A distributor plate 10 is interposed between two successive granular beds, denoted the upstream bed and the downstream bed. Each distributor plate 10 is divided into distinct panels separated by vertical partitions 5. An upper grid 4 supports the granular medium 2 while allowing the fluid to enter into the interior of the plate.

The panels comprise a distribution system 6 and a perforated injection chamber 8 which is used to inject or withdraw an auxiliary fluid into or from the plate. In the case of injection, the auxiliary fluid injected is then mixed with the principal fluid arriving from the upstream bed.

The distributor plate 10 also comprises a lower grid 3 or perforated plate, or any other means that can distribute the flow over the downstream granular bed.

The lower grid 3 may also be divided into panels. There is then one lower grid per panel.

The injection chambers 8 are supplied via the distribution system 6 which means that fluid can be brought from outside the vessel to each panel. The system 6 can also collect fluid from each panel. In the prior art, the system 6 is embedded in the granular medium 2.

Figure 1:
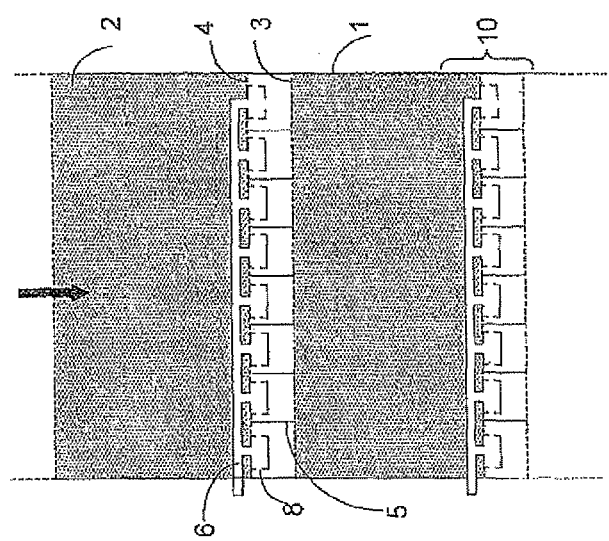
FIG. 1 shows a prior art device comprising a distributor plate divided into panels and supplied via a distribution system positioned in the granular bed located upstream of the distributor plate.

FIG. 2:

FIG. 2 has the same numbering of the elements as in FIG. 1, and shows an embodiment of the invention in which the distribution system 6 is now positioned inside the distributor plate 10 itself.

The distributor plate 10 may then have an increased height, depending on the case. The granular bed 2 no longer has an obstacle within it and thus the fluid can flow undisturbed.

Figure 3:
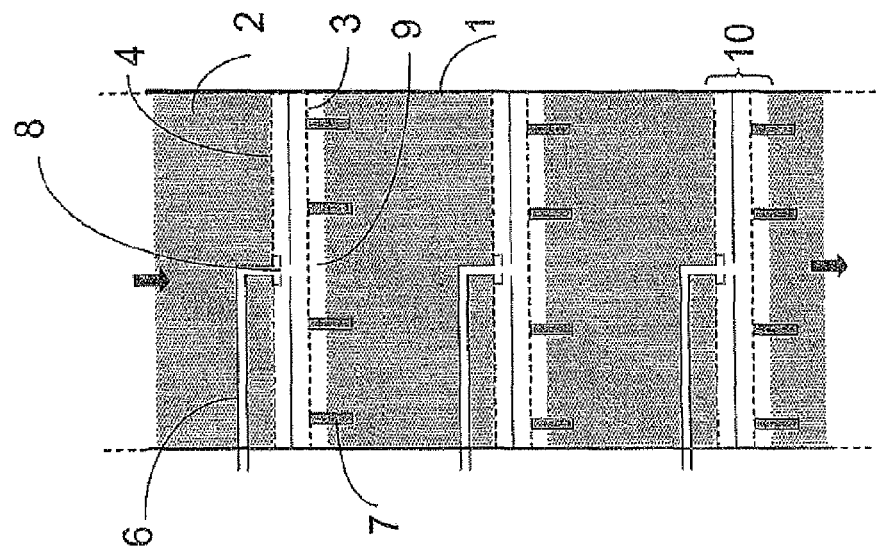
FIG. 3 shows another prior art embodiment. The distributor plate is placed on girders partially embedded in the granular bed.

FIG. 3:

FIG. 3, in accordance with the prior art, represents a distributor plate 10 which in this case has only one panel, placed on girders 7. The girders are partially embedded in the granular medium 2, which limits the height between the upper grid 4 and lower grid 3.

The distribution system 6 is also embedded in the granular bed 2. There is an empty space between the bottom of the plate 5 and the upper surface of the downstream granular bed. This space 9 conventionally forms part of the distributor plate 10.

Figure 4:
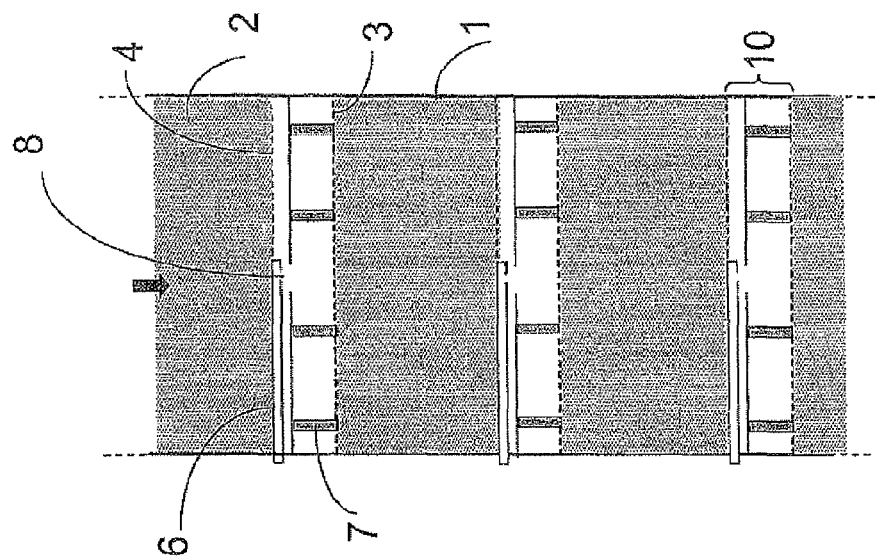
FIG. 4 shows a device in accordance with the present invention, with the girders and distribution system being positioned within the distributor plate itself.

FIG. 4:

FIG. 4 represents an embodiment of the invention. The numbering is the same as for FIG. 3. The distribution system 6 and the girders 7 are now integrated into the distributor plate 10 and included between the upper grid 4 and lower grid 3. To this end, the spacing between the two grids 4 and 3 has been increased compared with the prior art. The space 9 entirely contains the girders 7. The upstream and downstream granular beds are free of any obstacles. The advantage of the invention resides in the fact that the flow in the granular beds is improved in the absence of obstacles in the bed, and in that this improvement compensates for the loss of volume linked to the increase in the height of said distributor plate.

This effect of improving the overall performance of the beds is illustrated in the accompanying comparative examples.

COMPARATIVE EXAMPLES

The examples below compare the separation performances of a simulated moving bed (SMB) adsorption column in accordance with the prior art (reference case) and in accordance with the invention (case 1, 2, 3).

The performances are compared in terms of the number of theoretical plates per bed (NTP) present in the adsorption column. The performances were calculated using the numerical method described in the article cited in the prior art section. The NTP is representative of the quality of separation by adsorption, i.e. the purity and yield associated with separation.

All of the calculations were carried out under the following conditions:

15 meter useful length adsorption column with an 8 meter diameter, divided into 12 beds.

The reference case corresponds, in accordance with the prior art, with 0.05 m high distributor plates supplied via distribution systems embedded in the granular bed and occupying 1.2% of the total volume.

The plates were placed on girders occupying 2.41% of the total volume.

The liquid flow rate QL was 0.729 m$^3$/s. The mean surface velocity of the fluid in the reference case was thus 0.015 m/s.

The overall NTP per granular bed in the prior art case was then calculated to be 10.98.

The other cases, 1 to 3, represent different variations of the invention, in which the volume fraction of the internal means (system or girders) was reduced compared with the reference case.

According to the calculations, this reduction was accompanied by a greater or lesser increase in the height of the plate (H plate) and thus a reduction in the volume fraction occupied by the granular bed (% volume sieve).

Table 1 below summarizes the values for the plate height (H plate), the granular bed height (H bed) and the distribution, as a % by volume of the internal means, plate and sieve for the reference case and for cases 1, 2, 3 of the invention.

TABLE 1 comparison between different configurations at same liquid flow rate

| Case | Ref | 1 | 2 | 3 | |
|---|---|---|---|---|---|
| Adsorber diameter | 8 | 8 | 8 | 8 | m |
| QL | 0.729 | 0.729 | 0.729 | 0.729 | m$^3$/s |
| H plate | 0.05 | 0.1 | 0.19 | 0.1 | m |
| H bed | 1.2 | 1.15 | 1.06 | 1.15 | m |
| Vol %, internal means | 3.61% | 0.00% | 0.00% | 1.84% | |
| Vol %, plate | 4.00% | 8.00% | 15.2% | 8.00% | |
| Vol %, sieve | 92.39% | 92.00% | 84.8% | 90.16% | |
| Vsl | 0.0150 | 0.0145 | 0.0145 | 0.0148 | m/s |
| NTP total | 10.98 | 11.93 | 10.99 | 11.17 | |

It can be seen that all of the configurations in accordance with the invention (cases 1, 2 and 3) were better than the reference case, since the overall NTP per bed was constantly higher than 10.98.

case 1 (internal means volume=0%) has double plate volume than that of the reference case (8%). The volume of the granular bed was slightly reduced (92% as opposed to 92.39%). The NTP changed to 11.93, as opposed to 10.98 in the reference case;

case 2 (internal means volume=0%) had a higher plate volume than that of case 1, since the plate height was increased to 19 cm. The NTP was slightly increased to 11.0, despite the fairly substantial reduction in the volume occupied by the granular medium (84.8% as opposed to 92.39% in the reference case);

case 3 corresponds to a case in which the immersed volume of the internal means in the granular bed was 1.84%. The volume of the distributor plate remained at 8% and the volume of the granular bed was 90.2%, i.e. lower than that of the reference case (92.39%). In this case too, the NTP was increased to 11.18.

Table 2 again shows the three cases of Table 1, but the liquid flow rate QL was modified to adjust the NTP per bed of sieve to the reference value (NTP=10.98).

This means that the full benefit of the invention can be appreciated in terms of the gain in production capacity. Thus, the separation was carried out at iso-quality, but the increase in the liquid flow rate corresponds to a proportional increase in the separation capacity of the device as a whole.

TABLE 2 comparison between different configurations for same number of theoretical plates

| Case | Ref | 1 | 2 | 3 | |
|---|---|---|---|---|---|
| Adsorber diameter | 8 | 8 | 8 | 8 | m |
| QL | 0.729 | 0.792 | 0.730 | 0.742 | m$^3$/s |
| H plate | 0.05 | 0.1 | 0.19 | 0.1 | m |
| H bed | 1.2 | 1.15 | 1.06 | 1.15 | m |
| Vol %, internal means | 3.61% | 0.00% | 0.00% | 1.84% | |
| Vol %, plate | 4.00% | 8.00% | 15.2% | 8.00% | |
| Vol %, sieve | 92.39% | 92.00% | 84.8% | 90.16% | |
| Vsl | 0.0150 | 0.0157 | 0.0145 | 0.0150 | m/s |
| NTP total | 10.98 | 10.98 | 10.98 | 10.98 | |

It will also be noted that the invention can be used to increase the liquid flow rate and thus the production capacity of the device, which is proportional to it. Depending on the embodiment, the increase in capacity is between 0.1% and 8.6%, with the best results being obtained for case 1.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application No. 10102.426, filed Jun. 9, 2010 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A simulated moving bed column comprising: a multi-stage column operating in simulated moving bed (SMB) mode in combination with a device for distributing fluids within the column which comprises, in the direction of flow of the principal fluid, a distribution system (6) for auxiliary fluids, and a distributor plate (10) having an upper grid (4) and a lower grid (3) defining the upper and lower boundaries of the distributor plate, said distributor plate (10) being supported by girders (7), said distribution device being interposed between two successive beds of granular solid (2), denoted an upstream bed and a downstream bed, wherein the distribution system (6) and girders (7) are completely included between said upper grid (4) and said lower grid (3), and wherein the height of the distributor plate (10) is less than 0.2 meters and the column diameter is greater than 7 meters.

* * * * *